United States Patent [19]

Cyron

[11] Patent Number: 4,845,073
[45] Date of Patent: Jul. 4, 1989

[54] METAL CATALYST CARRIER BODY HAVING TWO DISSIMILARLY CORRUGATED SHEET-METAL LAYERS

[75] Inventor: Theodor Cyron, Bergisch Gladbach, Fed. Rep. of Germany

[73] Assignee: EMITEC Gesellschaft für Emissionstechnologie mbH, Lohmar, Fed. Rep. of Germany

[21] Appl. No.: 144,502

[22] Filed: Jan. 15, 1988

[30] Foreign Application Priority Data

Jan. 19, 1987 [DE] Fed. Rep. of Germany ....... 3701356

[51] Int. Cl.$^4$ ............................................. B01J 32/00
[52] U.S. Cl. ..................................... 502/439; 502/527
[58] Field of Search ............................... 502/439, 527

[56] References Cited

U.S. PATENT DOCUMENTS 3,966,646 6/1976 Noakes et al. ................ 502/527 X
4,098,722 7/1978 Cairns et al. ........................ 502/336

FOREIGN PATENT DOCUMENTS 0201614 11/1986 European Pat. Off.
2827934 1/1979 Fed. Rep. of Germany.
2636672 10/1986 Fed. Rep. of Germany.
3640025 5/1987 Fed. Rep. of Germany ...... 502/439
2134377 12/1972 France.
2079174 1/1982 United Kingdom.

Primary Examiner—W. J. Shine
Attorney, Agent, or Firm—Herbert L. Lerner; Laurence A. Greenberg

[57] ABSTRACT

A metal catalyst carrier body includes first and second differently corrugated sheet-metal layers being alternatingly wound defining conduits therebetween through which gas flows. The first sheet-metal layer has a simple first corrugation with a periodicity $\lambda_1$ and an amplitude $A_1$ primarily determining the size of the conduits. The second sheet-metal layer has a second corrugation with a periodicity $\lambda_2$ and an amplitude $A_2$. $\lambda_2 = (n.\lambda_1)/m$, where $n = 1, 2$ or $3$; $m = 1, 2, 3, 4, 5$ or $6$; and $m$ is $\geq n$, forming a multiplicity of periodically recurring oculating contact points having the same direction of curvature. Considering the shape and periodicity of the corrugations, the amplitude $A_2$ is smaller than the amplitude $A_1$ by at least an amount sufficient to cause the curvature of the first sheet-metal layer at the contact points to be at least substantially as large as the curvature of the second sheet-metal layer at the contact points.

16 Claims, 1 Drawing Sheet

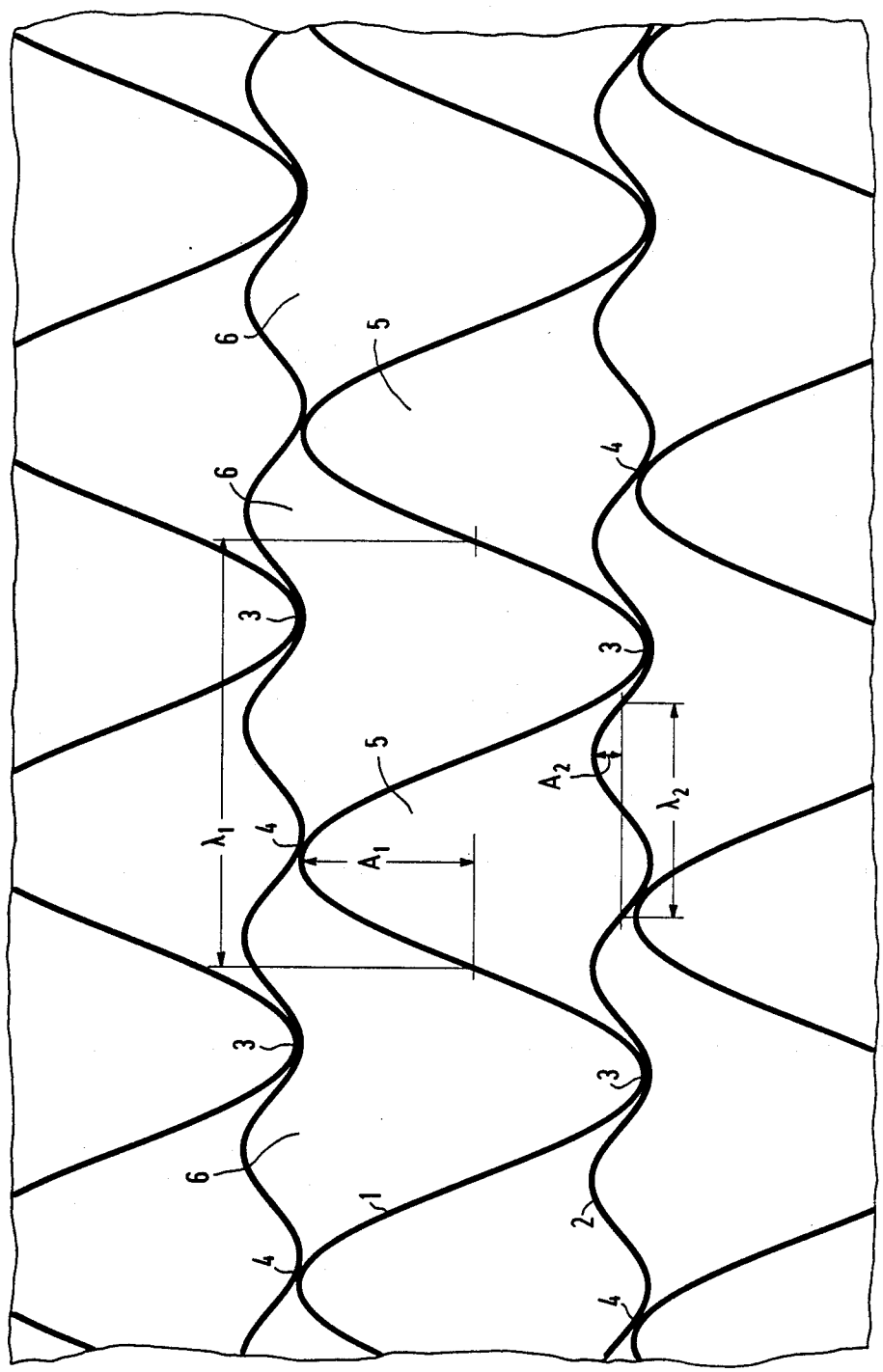

METAL CATALYST CARRIER BODY HAVING TWO DISSIMILARLY CORRUGATED SHEET-METAL LAYERS

The invention relates to a catalyst carrier body wound from alternating layers of two differently corrugated metal sheets, wherein one sheet-metal layer has a simple first corrugation of the periodicity and an amplitude, which primarily determines the size of conduits produced between the sheet-metal layers through which gas flows.

Metal catalyst carrier bodies of this type are used, for example, in the exhaust gas systems of motor vehicles, preferably as so-called "starting catalysts". These catalyst carrier bodies are exposed to severe alternating thermal stresses, which limit the service life thereof.

Various ways of increasing the elasticity of such catalyst carrier bodies and of controlling the compressive and tensile forces have already been proposed. German Published, Non-Prosecuted Application DE-OS No. 26 36 672, corresponding to U.S. Pat. No. 4,098,722 discloses a catalyst carrier body which is made up of alternating layers of two dissimilarly corrugated metal sheets. In this prior art type of double corrugation, as in other conventional versions of double corrugations as well, various problems arise. Corrugations having very low wavelengths are difficult to manufacture from a production standpoint, and moreover, with double corrugations that are irregularly wound over one another, the gas-admitting conduits which are formed are of very different sizes. In other wavelength configurations of the double corrugations, in which the number of contact points between the sheet-metal layers decreases, indefinite interstices are formed between the sheet-metal layers. All of these factors are disadvantageous upon subsequent coating of the catalyst carrier body with a ceramic composition and with the actual catalyst material itself. Either conduits having a small cross section and small gaps become plugged, or else undesirable ceramic bridges which later crumble in response to alternating thermal stress, form in small gaps.

It is accordingly an object of the invention to provide a metal catalyst carrier body having two dissimilarly corrugated sheet-metal layers, which overcomes the hereinafore-mentioned disadvantages of the heretofore-known devices of this general type and which has the most uniform possible distribution of the conduit cross sections, so that small conduits and gaps that become plugged do not cause pressure losses and so that no ceramic coating can crumble away.

With the foregoing and other objects in view there is provided, in accordance with the invention, a metal catalyst carrier body, comprising first and second differently corrugated sheet-metal layers being alternatingly wound defining conduits therebetween through which gas flows, the first sheet-metal layer having a simple first corrugation with a periodicity $\lambda_1$ and an amplitude $A_1$ primarily determining the size of the conduits, the second sheet-metal layer having a second corrugation with a periodicity $\lambda_2$ and an amplitude $A_2$, wherein: $\lambda_2 = (n.\lambda_1)/m$, where $n = 1, 2$ or $3$; $m = 1, 2, 3, 4, 5$ or $6$; and $m$ is $\geq n$, forming a multiplicity of periodically recurring contact points that are oculating or are adapted to one another having the same direction of curvature; and considering the shape and periodicity of the corrugations, the amplitude $A_2$ being smaller than the amplitude $A_1$ by at least an amount sufficient to cause the curvature of the first sheet-metal layer at the contact points to be approximately equal to or somewhat greater than the curvature of the second sheet-metal layer at the contact points.

The decisive feature among those mentioned above is that the two dissimilarly corrugated sheet-metal layers have periodicities permitting them to be synchronized with one another when they are wound. The result is a very uniform distribution of contact points, which have shapes that adapt to one another and an identical direction of curvature between the two metal sheets. With a corresponding selection of the shape, the amplitudes and the periodicities of the corrugations, it can be assured that no conduits of very small cross section form at these points of contact, but rather that each crest of the first corrugation touches the second sheet-metal layer only once. Due to the selection of the ratio between the periodicities of the two sheet-metal layers according to the invention, it is assured that at least a great number of contact points which are adapted in shape to one another, are produced during the winding process. Although a spiral winding prevents both the crests and troughs of the first layers from adapting in form to corresponding crests and troughs of the second layers, nevertheless this is attainable at least for one of the sides.

A catalyst carrier body produced according to the invention has a high elasticity, despite its very uniform distribution of the conduit cross sections, because all the surfaces defining the individual conduits are curved, and therefore can be relatively easily deformed. This is not the case with catalyst carrier bodies of alternating layers of smooth and corrugated metal sheets, for instance, which are also known in the prior art. When a catalyst carrier body of this kind is installed in a jacket tube, which prevents thermal expansions, this elasticity is highly advantageous and considerably prolongs the service life.

In accordance with another feature of the invention, the corrugations are substantially sinusoidal, $\lambda_2 = \lambda_1/2$ and $A_2 \leq A_1/2$. The corrugations are preferably produced by means of intermeshing toothed rollers. The simplest waveform thus producible is a sine-wave form, but other wave forms are also possible, for instance having steeper or less-steep flanks or lateral edges. In this connection, the periodicities, or in other words the wavelengths, of the two corrugations should also be at a ratio of 2:1. In order to meet the condition requiring a crest of the first corrugation to be allowed to touch the second sheet-metal layer only once, the amplitude of the second corrugation, with an otherwise identical waveform, must be at most only one-half as large as the amplitude of the first corrugation. However, an amplitude of the second corrugation that is this large would still always lead to relatively dissimilar conduit cross sections, despite the advantages of the present invention that would still exist.

Therefore, in accordance with a further feature of the invention, $A_2 \leq A_1/4$ and preferably $A_2 \leq A_1/8$.

According to this embodiment, the waviness of the second sheet-metal layer is still adequate to attain "synchronization" of the two corrugations during winding, and yet despite the high elasticity thereof, it no longer results in highly dissimilar conduit cross sections in the overall catalyst carrier body.

In accordance with an added feature of the invention, $\lambda_2 = \lambda_1/3$ and $A_2 \leq A_1/3$.

Thus the wavelength ratios of the two corrugations can also be 1:3, for example, and may have an amplitude ratio that is higher than 1:3. The above observations apply analogously. However, if a first corrugation already has a relatively short wavelength, this imposes technical limits for the smaller second corrugation.

In accordance with an additional feature of the invention, the sheet-metal layers have ends defining end surfaces of the catalyst carrier body, and the ends of the sheet-metal layers at least at one of the end surfaces being at least partly brazed at the contact points. This feature, which is known in many versions in the prior art, does not result in an undesirable stiffening of the end surfaces with the shaping according to the invention because as described above, all of the conduit walls are at least slightly curved and thus are elastic. Furthermore, the contact points which have shapes adapted to one another according to the invention can be brazed in a particularly durable fashion, because these contact points develop a greater capillary action and therefore take in liquid brazing material as a result of more-acute angles between the sheet-metal layers.

In accordance with a concomitant feature of the invention, the sheet-metal layers have inner and outer surfaces, and the contact points are disposed on the inner surface of the first sheet-metal layer and on the outer surface of the second sheet-metal layer. In other words, the inwardly oriented troughs of the first corrugation are synchronized during the winding with inwardly oriented troughs of the second corrugation, so that contact points which are adapted in shape to one another are produced at that location. During winding, this is technically simpler than synchronizing the outwardly oriented crests, because at least in the internal region of a catalyst carrier body the crests are spaced apart by notably greater distances than the troughs, since the circumference at the level of the crests is markedly greater than at the level of the troughs. The first sheet-metal layer, with its substantially greater amplitude, can more easily even out these differences by deforming slightly, if the synchronization with the second sheet-metal layer is effected at the troughs.

Other features which are considered as characteristic for the invention are set forth in the appended claims.

Although the invention is illustrated and described herein as embodied in a metal catalyst carrier body having two dissimilarly corrugated sheet-metal layers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

BRIEF DESCRIPTION OF THE DRAWING

The drawing is a fragmentary, diagrammatic, greatly enlarged, end-elevational view of one embodiment of a catalyst carrier body according to the invention which has been straightened out.

Referring now to the single figure of the drawing in detail, there is seen a first sheet-metal layer 1 having a wavelength $\lambda_1$ and an amplitude $A_1$ which is spirally wound in synchronized fashion with a second sheet-metal layer 2 having a wavelength $\lambda_2$ and an amplitude $A_2$. In the illustrated preferred embodiment, the wavelengths $\lambda_1$ and $\lambda_2$ vary in accordance with a ratio of 2:1. As a result, the troughs of the first sheet-metal layer 1 can be wound synchronously with the troughs of the second sheet-metal layer 2, so that contact points 3 that adapt in shape to one another are produced. The crests of the first sheet-metal layer 1 generally cannot be synchronized simultaneously with the corrugation of the second sheet-metal layer 2, resulting in irregular contact points 4 at those locations, but this is not deleterious to the advantageous characteristics of the catalyst carrier body according to the invention.

Due to the selected wavelength ratio, the resultant cross sections are only slightly different for various conduits formed between the layers through which gas flows. Conduits 5 located on the inside of the first sheet-metal layer 1 generally have a somewhat smaller cross section than conduits 6 located on the outside of the first sheet-metal layer 1. If the wavelength ratios which are selected are different from those in the illustrated embodiment, the cross-sectional differences may be somewhat greater or less. However, particularly small or particularly large cross sections are not produced, and the distribution of the various cross sections is very uniform.

Catalyst carrier bodies according to the invention are particularly suitable as starting catalysts for installation near the engine where there is severe alternating thermal stress, and they are distinguished by a long service life.

The foregoing is a description corresponding in substance to German Application P No. 37 01 356.4, dated Jan. 19, 1987, the International priority of which is being claimed for the instant application, and which is hereby made part of this application. Any material discrepancies between the foregoing specification and the aforementioned corresponding German application are to be resolved in favor of the latter.

I claim:

1. Metal catalyst carrier body, consisting essentially of first and second differently corrugated sheet-metal layers being alternatingly wound defining conduits therebetween through which gas flows, said first sheet-metal layer having a simple first corrugation with a periodicity $\lambda_1$ and an amplitude $A_1$ primarily determining the size of said conduits, said second sheet-metal layer having a second corrugation with a periodicity $\lambda_2$ and an amplitude $A_2$, wherein:

(a) $\lambda_2 = n \cdot \lambda_1 / m$
   where
   $n = 1, 2$ or $3$;
   $m = 1, 2, 3, 4, 5$ or $6$; and m is $\geq n$, forming a multiplicity of periodically recurring osculating contact points having the same direction of curvature; and (b) considering the shape and periodicity of said corrugations, said amplitude $A_2$ being smaller than said amplitude $A_1$ by at least an amount sufficient to cause the curvature of said first sheet-metal layer at said contact points to be at least substantially as large as the curvature of said second sheet-metal layer at said contact points.

2. Catalyst carrier body according to claim 1, wherein said corrugations are substantially sinusoidal, and:

(a) $\lambda_2 = \lambda_1 / 2$
   and (b) $A_2 \leq A_1 / 2$.

3. Catalyst carrier body according to claim 2, wherein $A_2$ is $\leq A_1 / 4$.

4. Catalyst carrier body according to claim 2, wherein $A_2$ is $\leq A_1/8$.

5. Catalyst carrier body according to claim 1, wherein:
(a) $\lambda_2 = \lambda_1/3$ and
(b) $A_2 \leq A_1/3$.

6. Catalyst carrier body according to claim 1, wherein said sheet-metal layers have ends defining end surfaces of the catalyst carrier body, and said ends of said sheet-metal layers at least at one of said end surfaces being at least partly brazed at said contact points.

7. Catalyst carrier body according to claim 2, wherein said sheet-metal layers have ends defining end surfaces of the catalyst carrier body, and said ends of said sheet-metal layers at least at one of said end surfaces being at least partly brazed at said contact points.

8. Catalyst carrier body according to claim 3, wherein said sheet-metal layers have ends defining end surfaces of the catalyst carrier body, and said ends of said sheet-metal layers at least at one of said end surfaces being at least partly brazed at said contact points.

9. Catalyst carrier body according to claim 4, wherein said sheet-metal layers have ends defining end surfaces of the catalyst carrier body, and said ends of said sheet-metal layers at least at one of said end surfaces being at least partly brazed at said contact points.

10. Catalyst carrier body according to claim 5, wherein said sheet-metal layers have ends defining end surfaces of the catalyst carrier body, and said ends of said sheet-metal layers at least at one of said end surfaces being at least partly brazed at said contact points.

11. Catalyst carrier body according to claim 1, wherein said sheet-metal layers have inner and outer surfaces, and said contact points are disposed on said inner surface of said first sheet-metal layer and on said outer surface of said second sheet-metal layer.

12. Catalyst carrier body according to claim 2, wherein said sheet-metal layers have inner and outer surfaces, and said contact points are disposed on said inner surface of said first sheet-metal layer and on said outer surface of said second sheet-metal layer.

13. Catalyst carrier body according to claim 3, wherein said sheet-metal layers have inner and outer surfaces, and said contact points are disposed on said inner surface of said first sheet-metal layer and on said outer surface of said second sheet-metal layer.

14. Catalyst carrier body according to claim 4, wherein said sheet-metal layers have inner and outer surfaces, and said contact points are disposed on said inner surface of said first sheet-metal layer and on said outer surface of said second sheet-metal layer.

15. Catalyst carrier body according to claim 5, wherein said sheet-metal layers have inner and outer surfaces, and said contact points are disposed on said inner surface of said first sheet-metal layer and on said outer surface of said second sheet-metal layer.

16. Catalyst carrier body according to claim 6, wherein said sheet-metal layers have inner and outer surfaces, and said contact points are disposed on said inner surface of said first sheet-metal layer and on said outer surface of said second sheet-metal layer.

* * * * *